(12) United States Patent
Tsumagari et al.

(10) Patent No.: US 7,440,388 B2
(45) Date of Patent: *Oct. 21, 2008

(54) INFORMATION STORAGE MEDIUM AND INFORMATION RECORDING APPARATUS FOR STORING VIDEO AND AUDIO SIGNALS DISTRIBUTED BY DIGITAL BROADCASTING

(75) Inventors: Yasufumi Tsumagari, Yokohama (JP); Shinichi Kikuchi, Kawasaki (JP); Kazuhiko Taira, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 11/443,286

(22) Filed: May 31, 2006

(65) Prior Publication Data

US 2006/0215535 A1 Sep. 28, 2006

Related U.S. Application Data

(62) Division of application No. 11/179,670, filed on Jul. 13, 2005, now Pat. No. 7,126,887.

(30) Foreign Application Priority Data

Jan. 31, 2002 (JP) ............................. 2002-024759

(51) Int. Cl.
*G11B 7/24* (2006.01)
(52) U.S. Cl. ................... 369/275.3; 369/30.08
(58) Field of Classification Search ....................... None
See application file for complete search history.

(56) References Cited

U.S. PATENT DOCUMENTS

| 6,473,379 B1 | 10/2002 | Kim et al. |
| 6,512,882 B1 | 1/2003 | Teunissen |
| 6,603,923 B2 | 8/2003 | Ando et al. |
| 2003/0081778 A1 | 5/2003 | Tsumagari et al. |

FOREIGN PATENT DOCUMENTS

| JP | 2000-268537 | 9/2000 |
| JP | 2001-067802 | 3/2001 |

OTHER PUBLICATIONS

Japanese Office Action dated Dec. 5, 2006 for Appln. No. 2004-232670.

*Primary Examiner*—Paul Huber
(74) *Attorney, Agent, or Firm*—Pillsbury, Winthrop, Shaw, Pittman, LLP

(57) ABSTRACT

An information storage medium according to an embodiment of this invention includes a management area for recording management information, and a data area for recording content data. The content data recorded in the data area contains a plurality of object data, each object data contains a plurality of data units, each data unit contains a plurality of packs, each pack contains at least one packet, the packet contains at least one transport stream packet, the management information recorded in the management area contains program chain information which manages the playback order of data contained in the object data, the program chain information contains cell information, and the cell information contains information that specifies an object to be played back.

1 Claim, 18 Drawing Sheets

| b7 | b6 | b5 | b4 | b3 | b2 | b1 | b0 |
|---|---|---|---|---|---|---|---|
| Identification code of recorded STB section | | | | SCD support | PCR support | PAT, PMT support | Unit start indicator support | Random access indicator support |

Identification code of STB section
 000: Ground wave digital broadcasting
 001: BS digital broadcasting
 010: STB of ver2 of ○○ TV
 011: STB of Ver1 of XX TV Random access indicator support flag
 0b···No 1b···Support Unit start indicator support flag
 0b···No 1b···Support PAT, PMT support flag
 0b···No 1b···Support PCR support flag
 0b···No 1b···Support SCD support flag
 0b···No 1b···Support

F I G. 4

SOBU_ENTRY

| | Contents | Number of bytes |
|---|---|---|
| SOBU Start Address | Start address of SOBU | 4 bytes |
| SOBU End Address (or Length) | End address or length of SOBU | 4 bytes |
| APAT(IAPAT) | Arrival time of TS packet at start of SOBU (difference time from immediately preceding TS packet) | 4 bytes |
| TS Paket length | TS packet length : normal : 0xbc | 2 bytes |
| REFPIC_Ns | Number of I pictures | |
| REFPIC_SA #1 | Start address of I picture #1 | |
| REFPIC_EA #1 | End address of I picture #1 | |
| ⋮ | | |
| REFPIC_SA #n | Start address of I picture #n | |
| REFPIC_EA #n | End address of I picture #n | |
| | Total | 27+(n−1)×8 |

FIG. 7

Time_Map_GI

| | Contents | Number of bytes |
|---|---|---|
| SOBU_Ns of a Time_Entry | Number of SOBUs in 1 Time_Entry | 4 bytes |
| Time_Entry Ns | Number of Time_Entrys | 4 bytes |
| Time Average of a Time_Entry | Average time of Time_Entry | 4 bytes |
| Time ofset | Start time of APAT : normally, 0 | 4 bytes |

Time_Entry

| | Contents | Number of bytes |
|---|---|---|
| SUBO_ENTN | Number of SOBU_Entry | 4 bytes |
| Time DIFF | Elapse time of current Time_Entry | 4 bytes |
| SOBU_ADR | Address of SOBU | 4 bytes |

FIG. 8

Normal

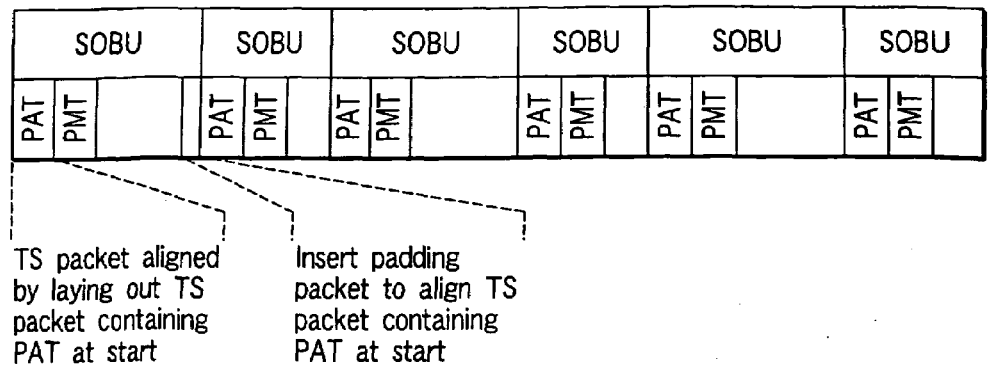

TS packet aligned by laying out TS packet containing PAT at start

Insert padding packet to align TS packet containing PAT at start

FIG. 9A

When no PAT or PMT is present at start of recording

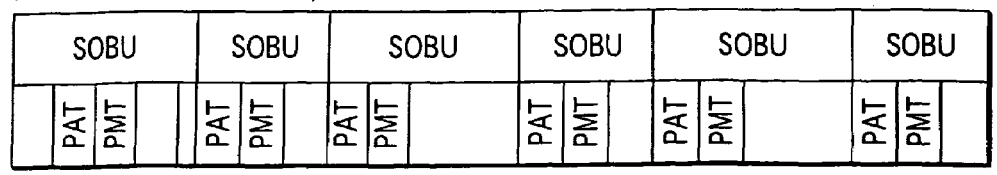

FIG. 9B

INFORMATION STORAGE MEDIUM AND INFORMATION RECORDING APPARATUS FOR STORING VIDEO AND AUDIO SIGNALS DISTRIBUTED BY DIGITAL BROADCASTING

CROSS-REFERENCE TO RELATED APPLICATIONS

This application is a divisional of U.S. application Ser. No. 11/179,670, filed Jul. 13, 2005 now U.S. Pat. No. 7,126,887, and for which priority is claimed under 35 U.S.C. §121. This application is based upon and claims the benefit of priority from U.S. application Ser. No. 10/354,071, filed Jan. 30, 2003, now U.S. Pat. No. 6,977,871. This application is based upon and claims the benefit of priority under 35 U.S.C. § 119 from the prior Japanese Patent Application No. 2002-024759, filed, Jan. 31, 2002, the entire contents of all applications are incorporated herein by reference in their entireties.

BACKGROUND OF THE INVENTION

1. Field of the Invention

The present invention relates to an information storage medium which stores digitally broadcasted video and audio signals. The present invention also relates to an information recording apparatus for recording, on an information storage medium, video and audio signals and the like distributed by digital broadcasting.

2. Description of the Related Art

Digital broadcasting is the recent trend in TV broadcasting, and the necessity of streamers for recording digital broadcasting is acknowledged.

Currently, MPEG-TS (Moving Picture image coding Experts Group-Transport Stream) defined by the MPEG standard is employed as the data transfer scheme in digital TV broadcasting in Japan, America, and Europe. The MPEG-TS scheme is projected to be the standard in the field of digital broadcasting using moving images.

Currently, as a device for recording digital broadcast data sent by MPEG-TS, D-VHS (Digital-Video Home System) using a tape as a recording medium is commercially available. However, from the viewpoint of accessibility, a device using an optical disk as a recording medium is demanded.

Digital TV broadcasting is sent from a broadcast station via a communication satellite and received and played back by an STB (Set Top Box). The STB is an apparatus which expands and plays back scrambled data on the basis of a key code supplied from the broadcast station. The data is scrambled to prevent any illicit reception by users who are not subscribers of that broadcast station.

In the STB, digital data is received by a tuner system. To directly play back the received data, the data is descrambled by a digital expansion section, decoded by an MPEG decoder section, converted into a TV signal by a video encoder section, and displayed on a TV.

To stream broadcast data, digital data received from the tuner system is recorded on a D-VHS through an IEEE (the Institute of Electrical and Electronics Engineers) 1394 I/F. IEEE 1394 is an interface standard for command exchange and data transmission/reception.

To play back recorded broadcast data, the data is read from the D-VHS, sent to the data expansion section in the STB, and played back.

In the D-VHS streamer, however, the broadcast bit stream is directly recorded on the tape. Hence, a plurality of programs are multiplexed and recorded on the tape. In the playback mode, all data is sent regardless of whether a program is to be played back from the beginning or halfway. The STB selectively plays back a desired program.

In addition, since programs are recorded on a tape medium, random access is impossible. It is therefore difficult to quickly jump to a desired position of a desired program and play it back.

To do this, a streamer standard using a large-capacity disk medium such as a current DVD (Digital Versatile Disk)-RAM is suggested.

Digital broadcasting by ground waves is expected to start in several years. Free digital broadcasting will start. This will be done as non-scrambled broadcasting.

The streamer standard aims at processing scrambled broadcasting data at various broadcast stations all over the world. The minimum playback unit in video contents is a data amount based on an ECC block. For this reason, in a special playback mode, even when data is read from a target address, no I picture that can be played back is found. Hence, the start of playback may largely shift. That is, it is very difficult to perform special playback in this standard.

A standard that lays out PAT (Program Association Table) or PMT (Program Map Table) at the start of video contents is described in Jpn. Pat. Appln. KOKAI Publication No. 2000-268537. However, in this prior art or in the streamer standard, since there is no TMAP information as in DVD-VR, processing is incompatible with DVD-VR.

In a streamer system compatible with digital TV broadcasting, fine management cannot be executed in special playback of video content data.

BRIEF SUMMARY OF THE INVENTION

It is an object of the present invention to provide an information storage medium for storing a stream compatible with digital TV broadcasting and management information suitable for management of the stream. It is another object of the present invention to provide an information recording apparatus for recording a stream compatible with digital TV broadcasting and management information suitable for management of the stream.

In order to solve the above problems and achieve the objects, an information storage medium and information recording apparatus of the present invention have the following arrangements.

(1) According to an embodiment of the present invention, there is provided an information storage medium comprising a management area for recording management information, and a data area for recording content data, wherein the content data recorded in the data area contains a plurality of objects, each object contains a plurality of data units, each data unit contains a plurality of packs, each pack contains at least one packet, the packet contains at least one transport stream packet, the management information recorded in the management area contains program chain information which manages a playback order of data contained in the objects, the program chain information contains cell information, and the cell information contains information that specifies an object to be played back.

(2) According to an embodiment of the present invention, there is provided an information recording apparatus for recording information on an information storage medium including a management area and data area, comprising a recording section recording management information in the management area and object in the data area, a read section reading object management information which manages the objects contained in the management information, and a deciding section deciding identification information of objects to be played back on the basis of the objects management information read by the read section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a view showing support information contained in a PGC_GI;

FIG. 7 is a view showing data contained in a SOBU_ENTRY;

FIG. 8 is a view showing data contained in a TMAPI;

FIGS. 9A and 9B are views showing an example of SOBU division;

DETAILED DESCRIPTION OF THE INVENTION

An embodiment of the present invention will be described below with reference to the accompanying drawing.

In the present invention, the minimum playback unit in video contents is formed by laying out a TS packet such as PAT, PMT, or SI at the start, on the basis of the domestic digital broadcasting standard, i.e., ARIB (Association of Radio Industries and Businesses) standard. This playback unit is made to be compatible with the streamer standard, whereby special playback is facilitated.

Hence, in the present invention, the minimum playback unit in video contents is formed by laying out a TS packet such as PAT, PMT, or SI at the start of a DVD-streamer format. A function of recording detailed information related to the minimum unit is added, thereby facilitating special playback.

In a DVD, currently, management data is formatted on the basis of the format of a formatted DVD-video. However, DVD-video is not formatted for satellite broadcasting and the like. For this reason, this format cannot cope with special playback.

Figure 1:
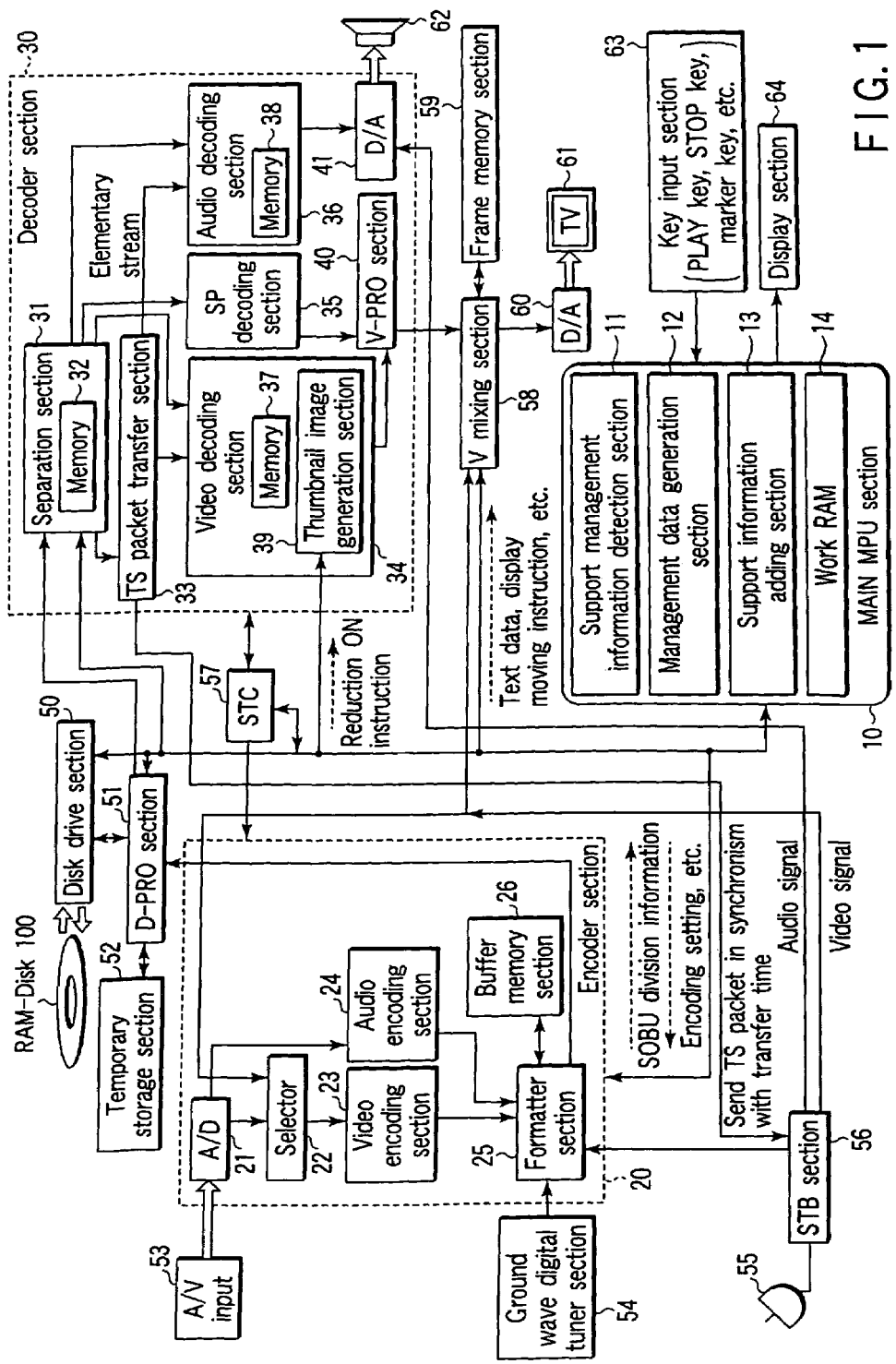
FIG. 1 is a view showing the schematic arrangement of an information recording/playback apparatus according to an embodiment of the present invention.

FIG. 1 is a view showing the schematic arrangement of an information recording/playback apparatus which records a stream compatible with digital TV broadcasting on an information storage medium 100 or plays back a stream compatible with digital TV broadcasting, which is stored in the information storage medium 100.

As shown in FIG. 1, the information recording/playback apparatus comprises an MPU section 10, encoder section 20, decoder section 30, disk drive section 50, D-PRO section 51, temporary storage section 52, A/V input section 53, ground wave digital tuner section 54, satellite antenna 55, STB section 56, STC (System Time Counter) section 57, V mixing section 58, frame memory section 59, D/A section 60, TV 61, speaker 62, key input section 63, and display section 64.

The MPU section 10 has a support management information detection section 11, management data generation section 12, support information adding section 13, and work RAM 14. The encoder section 20 has an A/D section 21, selector 22, video encoding section 23, audio encoding section 24, formatter section 25, and buffer memory section 26. The decoder section 30 has a separation section 31, memory 32, TS packet transfer section 33, video decoding section 34, SP decoding section 35, audio decoding section 36, memory 37, memory 38, thumbnail image generation section 39, V-PRO section 40, and D/A section 41.

Figure 2:
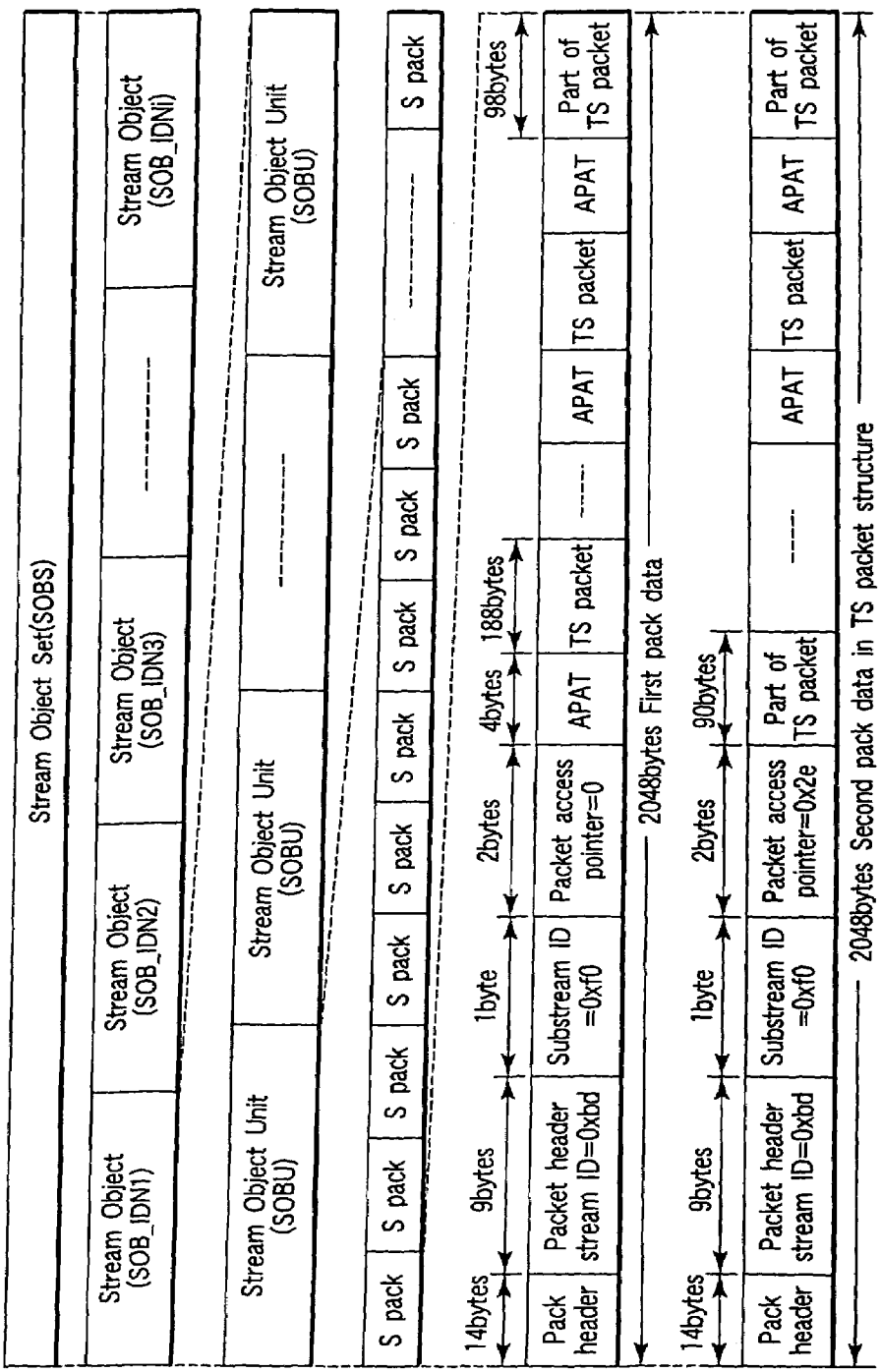
FIG. 2 is a view showing the data structure of a SOBS stored in an information storage medium according to an embodiment of the present invention.
Figure 3:
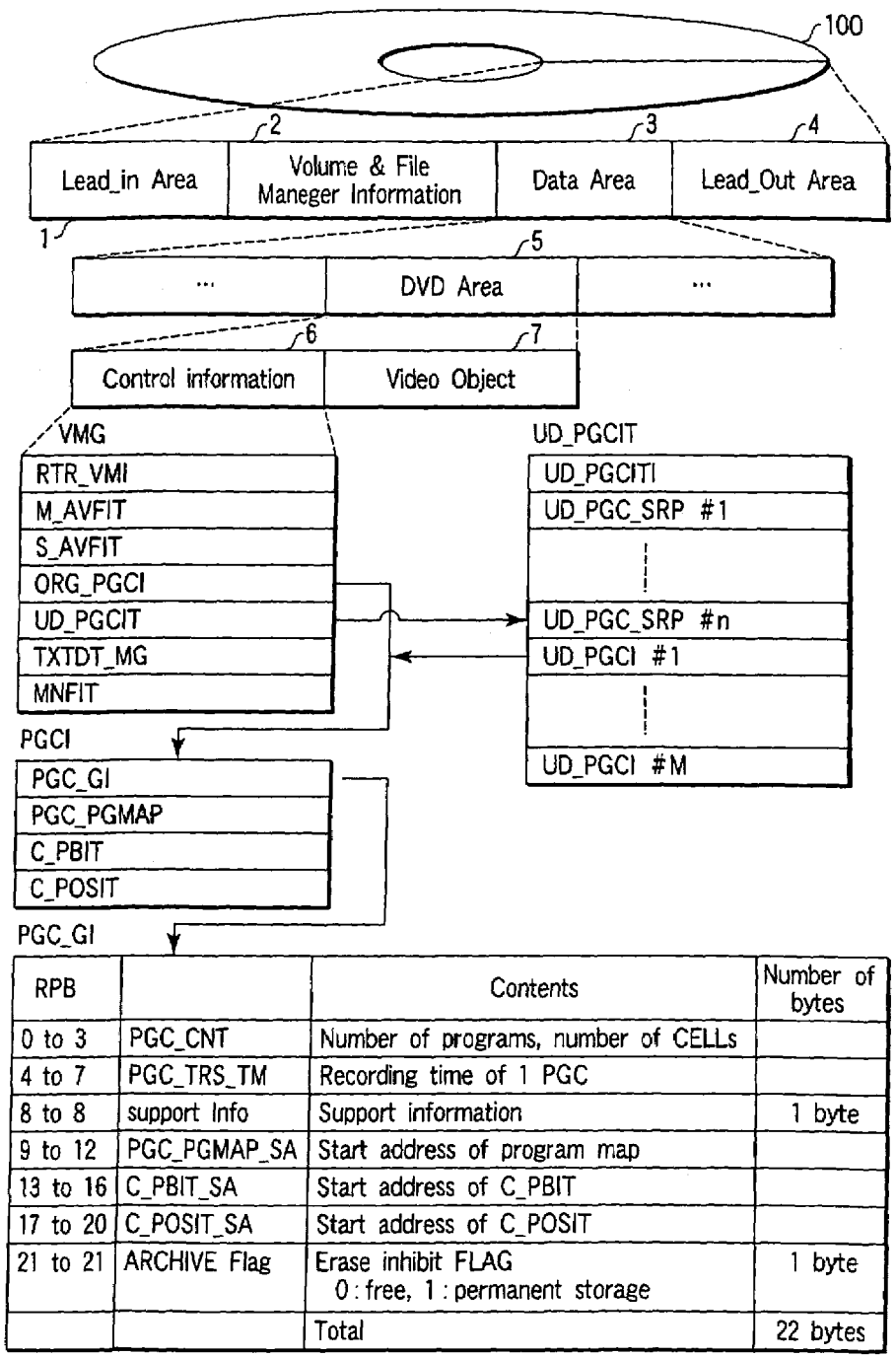
FIG. 3 is a view showing the data structure of the information storage medium according to the embodiment of the present invention and, more particularly, an example of data contained in a PGC_GI.
Figure 5:
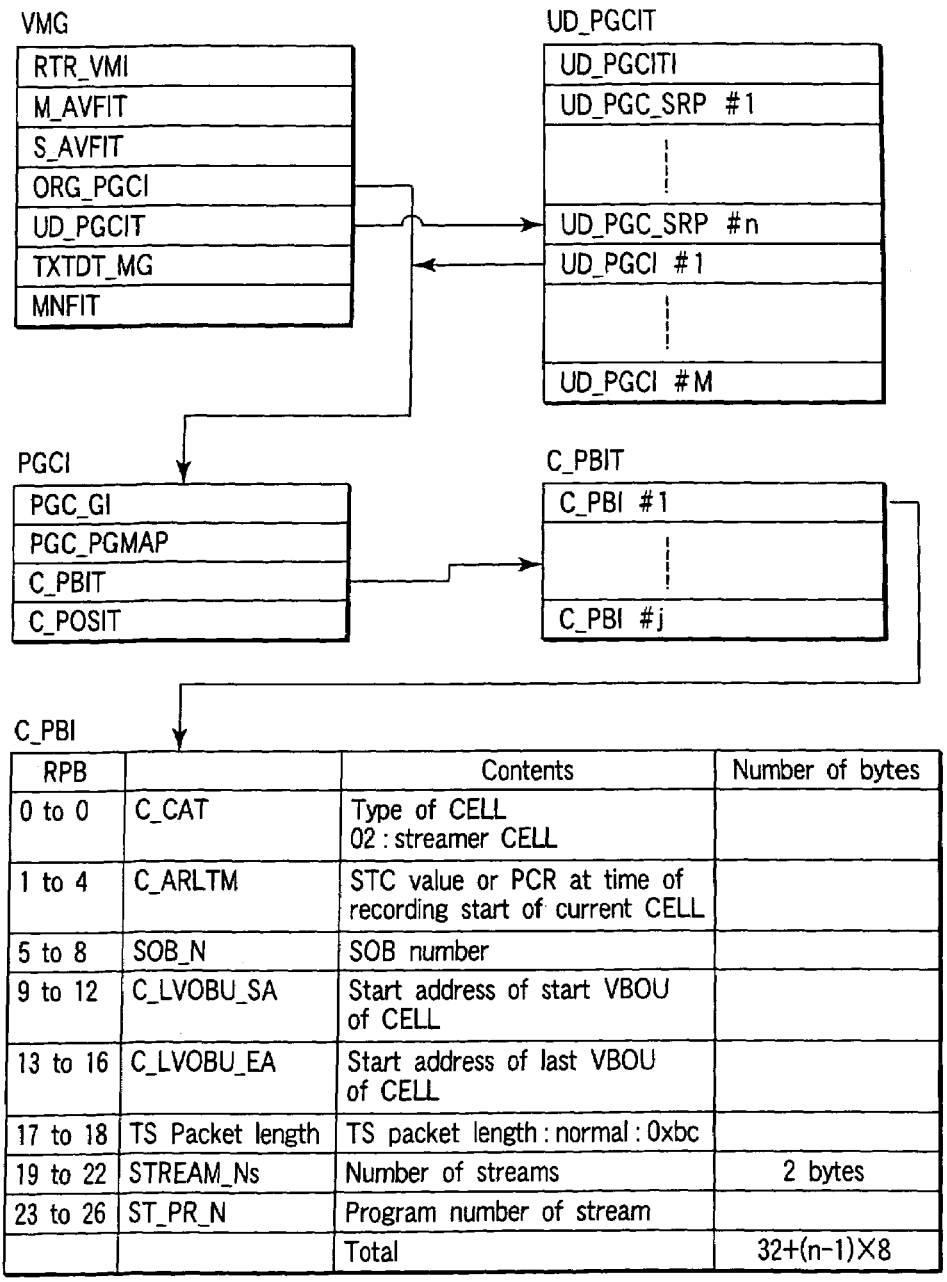
FIG. 5 is a view showing data contained in a C_PBI.
Figure 6:
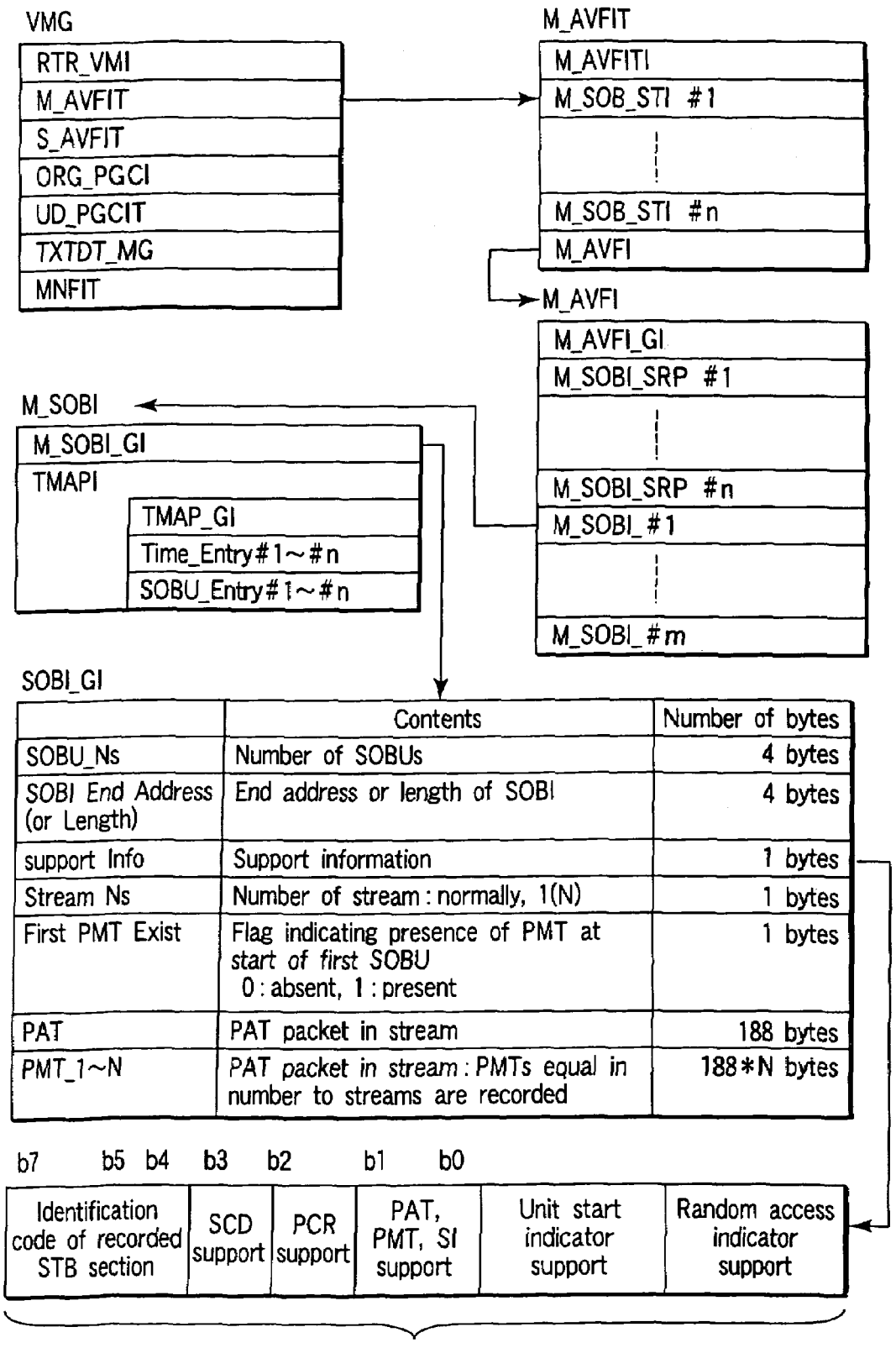
FIG. 6 is a view showing data contained in a SOBI_GI.

FIG. 3 is a view showing the data structure of an information storage medium of the present invention. As shown in FIG. 3, the information storage medium has a lead-in area 1, volume & file manager information area 2, data area 3, and lead-out area 4. The data area 3 has a DVD area 5. The DVD area 5 has a control information area 6 and video object area 7. For example, management information is stored in the control information area 6. Also, an SOBS shown in FIG. 2 is stored in the video object area 7.

FIG. 2 is a view showing the data structure of the SOBS.

The SOBS contains a plurality of SOBs (Stream OBjects). Each SOB contains a plurality of SOBUs (Stream OBject Units). Each SOBU contains a plurality of S_PACKs in which TS streams are recorded. Each S_PACK contains a pack header, packet header, substream ID, packet access pointer, arrival time at the time of recording (APAT: Application Packet Arrival Time), TS packet, and padding packet.

The packet access pointer indicates the address of the first TS packet in the pack as an address in the pack. When the packet access pointer is 2034, it means that the start of the packet is not present in one pack.

Figure 10:
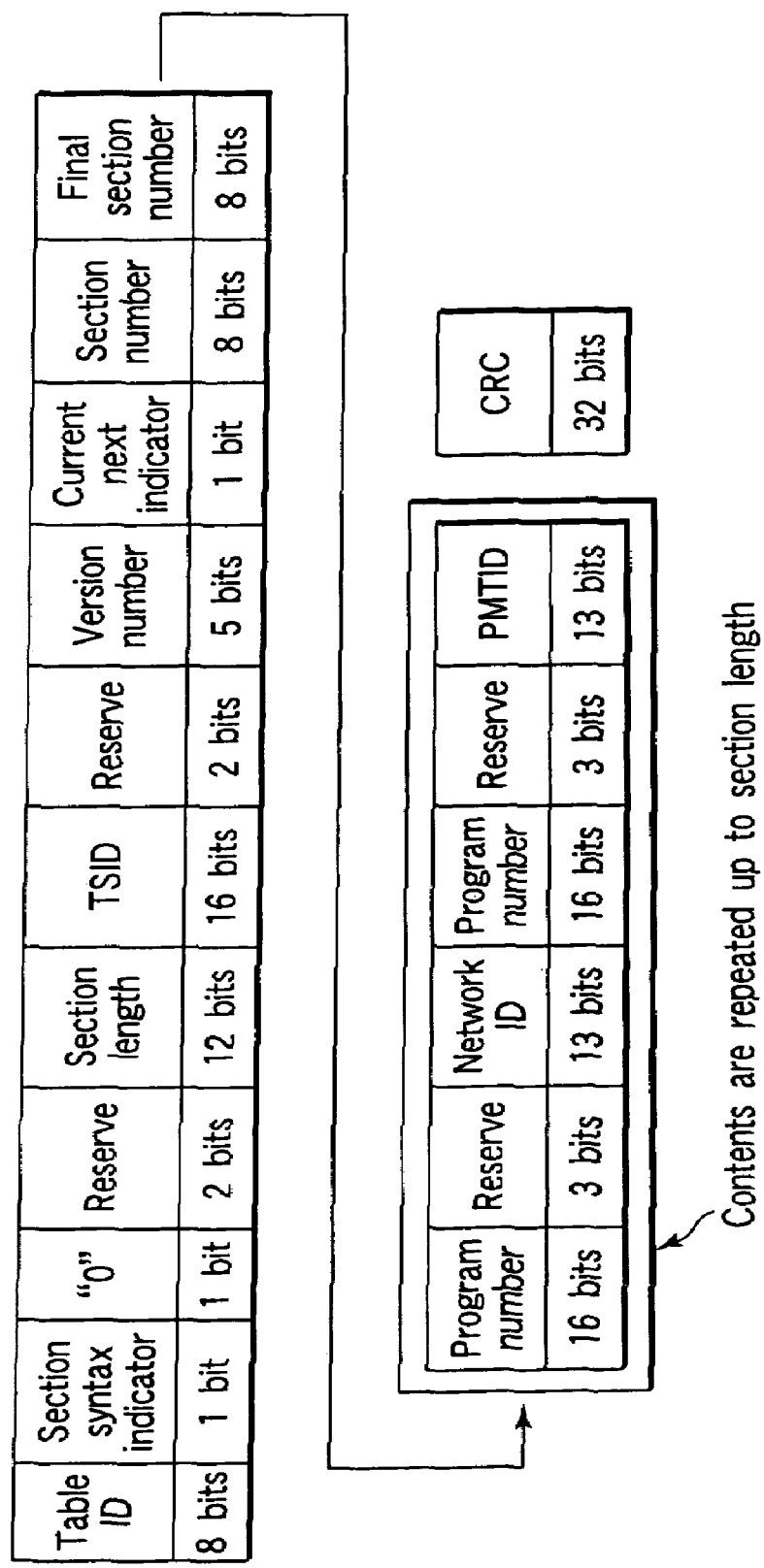
FIG. 10 is a view showing data contained in a PAT.
Figure 11:
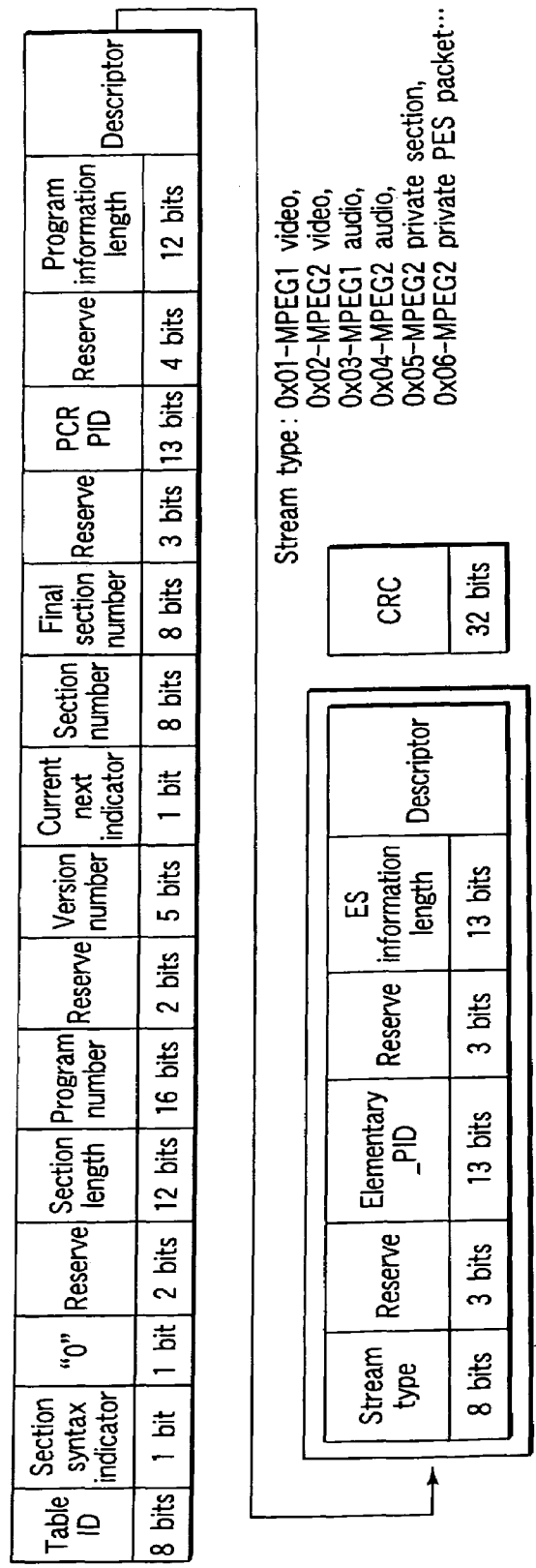
FIG. 11 is a view showing data contained in a PMT.
Figure 12:
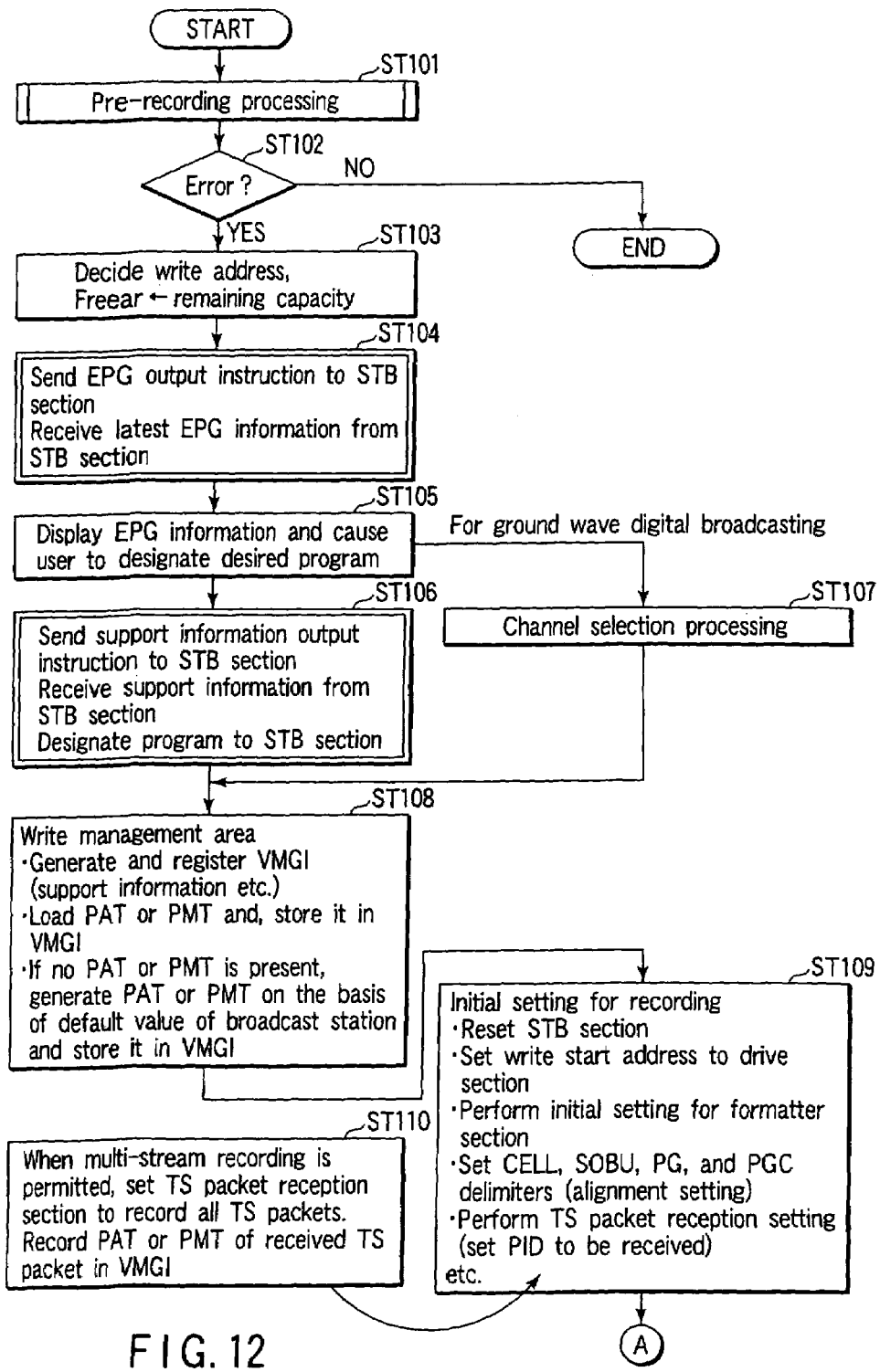
FIG. 12 is a flow chart showing recording processing 1.
Figure 13:
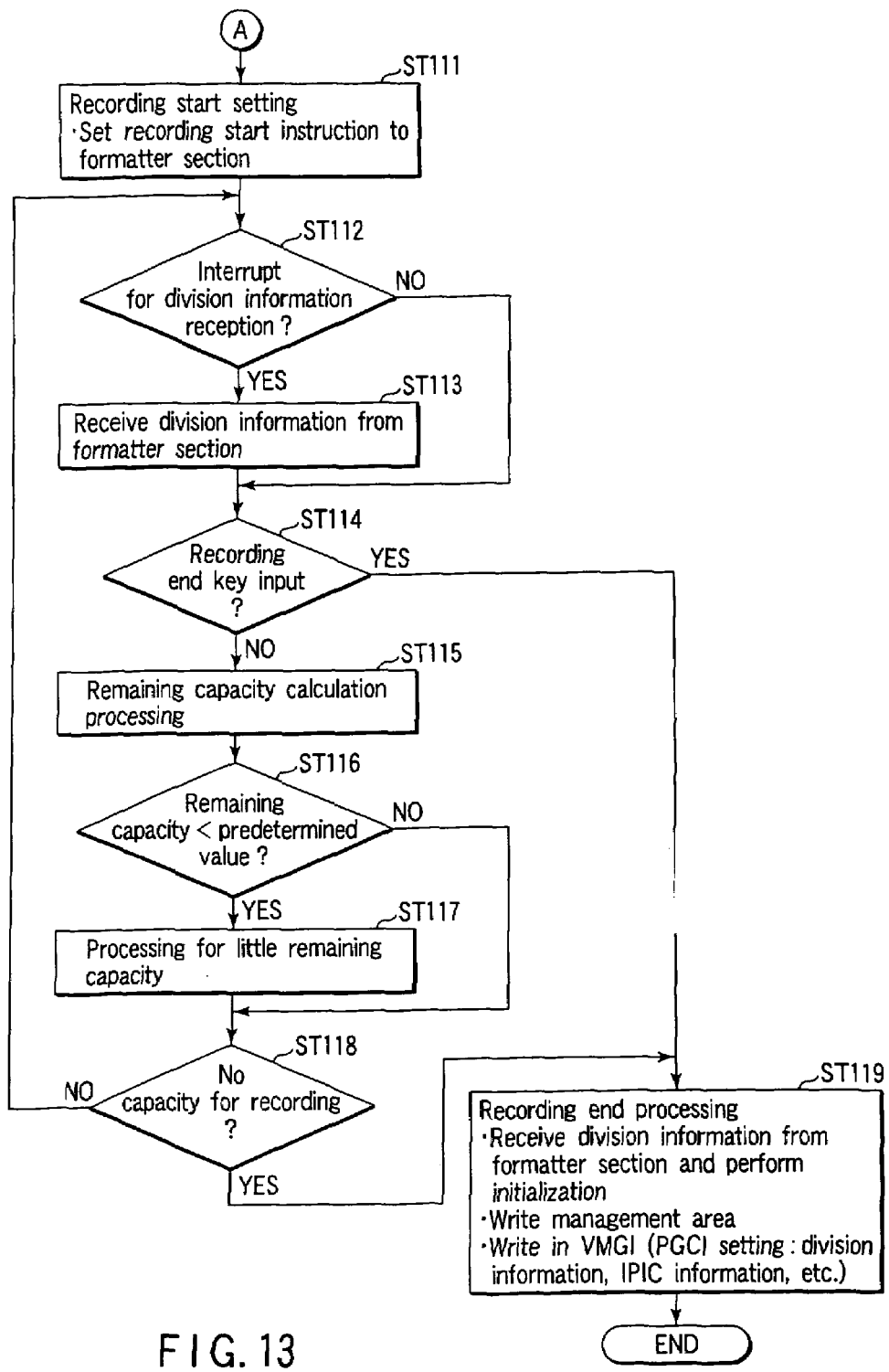
FIG. 13 is a flow chart showing recording processing 2.
Figure 14:
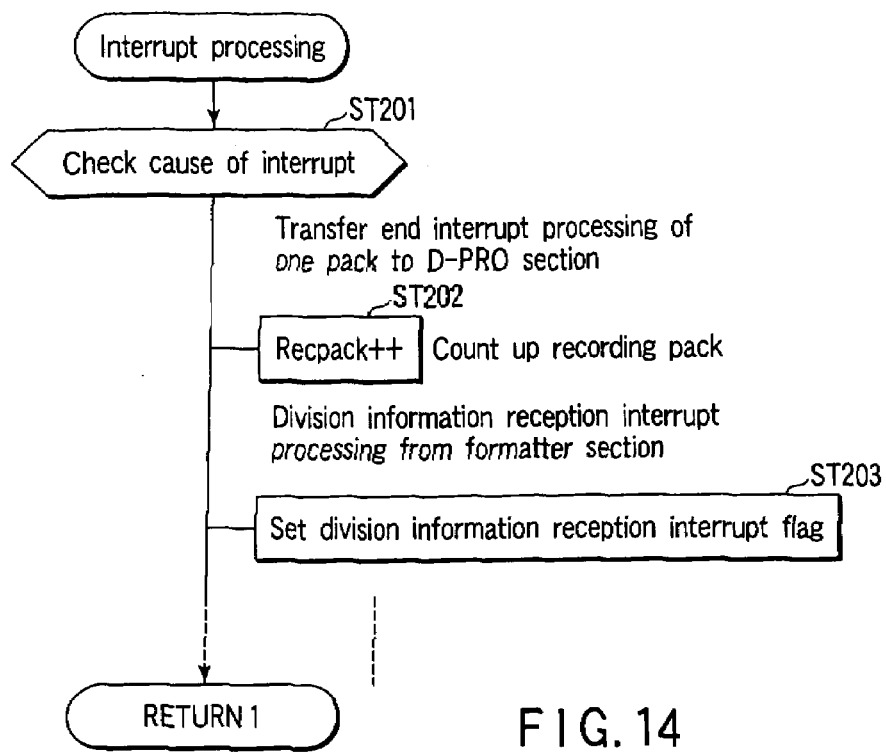
FIG. 14 is a flow chart showing interrupt processing.
Figure 15:
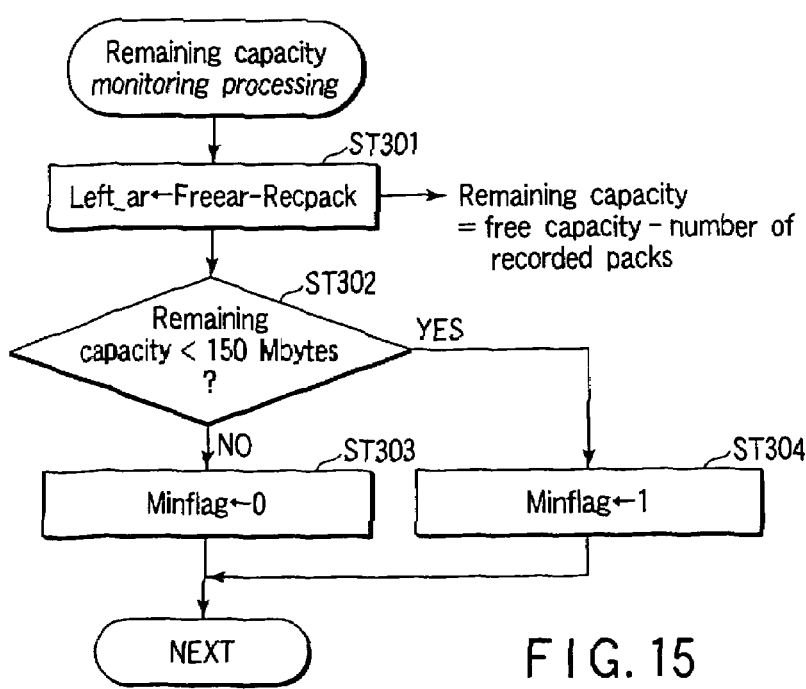
FIG. 15 is a flow chart showing remaining capacity monitoring processing.

However, as shown in FIGS. 9A and 9B, the first pack in the SOBU must always be aligned to the start of the packet. This makes it possible to cope with a packet having a size greater than one pack. One SOBU is designed to have a PMT or SI at the start and contain n PATs or PMTs. Here, n is an integer ($n \geq 1$). FIG. 10 shows the contents of a PAT. FIG. 11 shows the contents of a PMT.

The management data structure will be described next with reference to FIGS. 4 to 8.

The signal flow in recording will be described first. TS packet data received by the STB section 56 is placed into a pack by the formatter section 25 and recorded. At this time, the presence/absence of each type of information is detected. Detected information is stored in the work RAM 14 and recorded as management information at the end of recording.

For digital ground wave broadcasting, the signal is received not by the STB section 56 but by the tuner 54 in the set. Assume that the ground wave is not scrambled. Hence, the signal can be directly played back (decoded). The processing is basically the same as the recording processing through the STB section 56 except that information representing that the signal has been received by the internal tuner is recorded in the management information.

In a playback mode, pack data read from the information storage medium is analyzed by the separation section 31. If the pack contains a TS packet, the TS packet is sent to the TS packet transfer section 33. Which tuner has received the data is checked on the basis of the management information. If the data has been received by the STB section 56, the TS packet transfer section 33 transfers only the TS packet at the same time interval as that at arrival.

The STB section 56 executes decoding, generates an AV signal, and displays it on the TV 61 through the streamer video encoder section 20.

For a digital ground wave, the signal is sent to the internal decoding sections 34, 35, and 36 and decoded (played back). At this time, the TS packet transfer section 33 sends elementary data to each decoder.

In a scheme of broadcasting (distributing) compressed moving images, such as digital TV broadcasting or cable broadcasting, as in the Internet, a TS stream as a common basic format is divided into a packet management data portion and a payload.

The payload contains scrambled data to be played back. According to ARIB, a PAT (Program Association Table), PMT (Program Map Table), or SI (Service Information) are not scrambled.

Data to be played back includes MPEG video data, Dolby, AC3, audio data, and MPEG audio data. Information such as a PAT, PMT, and SI which is necessary for playback, although not directly relevant to the data to be played back, and EPG (program information), also included.

A PAT contains the PID (Packet IDentification) of the PMT of each program. In the PMT, the PID of video data or audio data is recorded.

As the normal playback procedure of the STB, when the user determines a program on the basis of EPG information, the PAT is read at the start time of the target program. On the basis of that data, the PID of the PMT belonging to the desired program is determined. The target PMT is read in accordance with the PID. The PIDs of video and audio packets to be played back, which are contained in the PMT, are read and set in each decoder. The video and audio data are extracted and played back in accordance with the PIDs. The PAT, PMT, SI, and the like are transmitted every several hundred ms because they are also used to play back the program from halfway.

To record this data on a disk medium (information storage medium 100) such as a DVD-RAM, it is more advantageous to directly record the broadcast data as digital data.

However, since the current highest bit rate of the DVD-RAM is 10.08 Mbps, satellite broadcasting (20 Mbps or more) itself, in which all channels are multiplexed, cannot be recorded. Hence, one program must be selected and recorded.

However, the next generation DVDs have a bit rate of 30 Mbps or more and can directly record satellite broadcasting.

To simultaneously record a plurality of streams, a PMT that has a number of streams to be recorded and corresponds to each stream is stored in the SOBI, and the number of the stream to be played back (channel number or the PID of the PMT) is recorded in the C_PBI.

When data is recorded on a disk medium, data that manages the recorded data is required to satisfy a user's request for fast forward or starting playing back of a desired program from a desired time.

However, if the data to be played back is scrambled, the management data cannot be generated from the playback data itself.

The management data can be generated using data in the packet header as control data in a TS stream packet, a PAT packet serving as PSI (Program Specific Information) data of the TS stream, or data of the PMT packet.

Note that the contents of these packet headers contain information that may not supported, depending on the type of satellite broadcast.

For this reason, if management data is to be generated in the above way without any preparation, no management data can be generated for each satellite broadcast, and the satellite broadcast cannot be recorded.

In the present invention, information representing whether packet header information, a PAT, or a PMT to be used by satellite broadcasting present in management information is stored at the time of recording. Management data is generated in accordance with the supported information. In the playback mode, the service contents are changed on the basis of the support information to provide only a possible service.

A method of detecting support information is disclosed in Jpn. Pat. Appln. KOKAI Publication No. 2000-268537.

The management method will be described below.

In a PAT or PMT packet, the PID of each piece of data that is to be played back as a program is recorded.

These pieces of data are inserted at an interval of several hundred ms to several s. To play back a program from halfway, it is done on the basis of the data.

The PAT or PMT can be used as a delimiter of data, as shown in FIGS. 9A and 9B.

At the start of recording, however, information may not start from a PAT, PMT, or SI. Hence, a flag indicating whether a PAT, PMT, or SI is present at the start of a SOBU may be set. If a PID or the like is known in advance from EPG or a broadcast station, a PAT or PMT is generated on the basis of the information and stored as management information. If even such information is not present, the next PAT or PMT closest to the start is copied and stored. If a recorded TS packet contains, e.g., a random access indicator capable of specifying the position of an I picture, information representing it, APAT (Application Packet Arrival Time) (IAPAT: Incremental APAT) from the start of the immediately preceding SOBU, or the address from the start of the target SOB in an SRO file is stored in a SOBI.

As for SOBU dividing processing, the start of a SOBU is aligned to the start of a PAT or PMT packet, as shown in FIGS. 9A and 9B. This makes it possible to play back a program from halfway for each SOBU. However, video data following the PAT or PMT does not always start from an I picture. For this reason, a small time lag may be generated until an I picture is detected. As shown in FIG. 9B, if no PAT or PMT packet is present at the start of recording, the start of a SOBU does not match the start of a PAT packet. In this case, the SOBI has a flag indicating that the starts do not match.

Data processing in the recording mode will be described next with reference to FIGS. 12, 13, 14, 15, and 20.

(1) Upon receiving a recording instruction from the key input section 63, the MPU section 10 loads management data from the drive section 50 and decides a write area. As prerecording processing (ST101), the disk is checked. It is determined whether the disk is a next-generation DVD disk (a DVD-RAM disk that has a large capacity and can record at a high rate). If the disk is a next-generation DVD disk, multi-stream recording is permitted. If NO (if the disk is a current DVD-RAM or DVD-RW), multi-stream recording is inhibited. In addition, the file system is checked to determine whether recording is possible. If recording is possible, a recording position is decided (ST103). If recording is impossible, the user is notified of it, and the processing is stopped.

(2) Setting is done in the management area to write in the decided area. The write start address of video data is set in the drive section 50, thus performing preparation for data recording.

(3) An instruction is output to read EPG (Electronic Program Guide) from the STB section 56 (ST104). The STB section 56 prepares latest EPG (EPG data that has been received or stored in advance in the work memory in the STB section 56) and returns that data to the MPU section 10. For ground wave digital broadcasting, an EPG window is created by data that is inserted into a digital broadcast, and the data is stored in the work memory.

(4) The MPU section 10 displays the EPG data and prompts the user to select a program to be recorded. When the program to be recorded is decided (ST105), the MPU section 10 receives support information from the STB section 56 (ST106). If no support information is present in the STB section 56, it is checked during recording whether corresponding information is present, and the detected information is used in place of support information. For ground digital broadcasting, support information is generated on the basis of support information that is predetermined by the broadcast station of the program to be broadcast (ST108).

(5) The time of the STC section 57 is reset (ST109). The STC section 57 is the system timer. Recording or playback is executed with reference to the value of the timer.

(6) The STB section 56 receives the designation of target program to be recorded and starts reception. For ground wave broadcasting, a channel is selected as usual. Then, a PAT is loaded, a PID to be used to receive the PMT of the target program is decided, the target PMT is loaded, and the PID of each piece of data (video and audio data) to be decoded (to be recorded) is decided. At this time, the PAT or PMT is stored in the work RAM section 14 of the MPU section 10 and written in the management information. In a system having no PAT or PMT, a PMT is generated in accordance with a PID that is determined in advance, and written in the management information.

(7) VMG file data is written in the file system, and necessary information is written in the VMGI (ST110). If support information is known, it is also written.

(8) Recording settings are performed for each section (ST111). At this time, data division setting and TS packet reception setting are done in the formatter section 25. At this time, the PID of the data to be recorded is set such that only the target video stream is recorded.

(9) Stream data to be recorded is received from the STB section 56 or ground wave digital tuner section 54, loaded to the encoder section 20, and placed into a pack. If it is detected at the start of recording that the data does not start from a PAT or PMT, a flag is set in the VOBI of the management information. The first PAT or PMT after the start of recording is stored in the work RAM 14 and written in the management information.

(10) During recording, division information is stored in the work RAM 14 of the MPU section 10 periodically (before the buffer memory section 26 of the formatter section 25 is full) (ST112 and ST113). The division information is SOBU division information containing the start address of the SOBU, the pack length of the SOBU, if the address of the I picture is known, the start and end addresses of the I picture, the arrival time (APAT) of the SOBU, and the like.

(11) The remaining capacity is checked (ST115). If the capacity has decreased to a predetermined value or less (ST116), processing for little remaining capacity (ST117) is executed.

(12) It is checked whether recording is ended (whether the recording end key is pressed or whether no capacity remains) (ST118). If YES in step ST118, remaining division information is loaded from the formatter section, added to the work RAM, and recorded in the management data (VMGI). In addition, the remaining information is recorded in the file system (ST119).

(13) If NO in step ST118, the flow returns to step ST112 to continuously receive and play back the data.

A video signal flows in the following way. First, a TS packet input from the STB section 56 is input to the formatter section 25. For ground wave digital broadcasting, TS packet data is loaded from the ground wave digital tuner section 54 and input to the formatter section 25. The time from the start of transfer is read from the value of the STC 57 and stored in the buffer RAM as management information. This information is sent to the MPU section 10 and recorded in the management information together with division information. As division information, SOBU division information is generated and periodically sent to the MPU section 10. The formatter section 25 temporarily stores the TS packet data in the buffer memory section 26. Then, the formatter section 25 places the received TS packet data into a pack, formats it into a pack stream shown in FIG. 7, and inputs the pack stream to the D-PRO section 51. REFPIC_Ns shown in FIG. 7 indicates the number of I pictures. REFPIC_Ns is "0" when no random access indicator is present. REFPIC_SA #n indicates the address of a TS pack containing the first TS packet of I picture #n (a TS pack with an active random access indicator). REFPIC_EA #n indicates the address of a TS pack containing the last TS packet of I picture #n (a TS pack with an active unit start indicator). If no unit start indicator is present, REFPIC_EA #n is "0".

For ground wave digital broadcasting without any scrambling, the data is simultaneously sent to the decoder section 30 as well as to the D-PRO section 51, played back, and displayed on the TV. In this case, the MPU section 10 sets the playback time in the decoder section 30. After that, the decoder section 30 automatically plays back the data.

The D-PRO section 51 sends, to the drive section 50, 16 packs as an ECC group with an ECC. If the drive section 50 is not ready for recording on the disk, the ECC group is transferred to the temporary storage section 52. Processing waits until the drive section 50 becomes ready for recording data. When the drive section 50 is ready, recording is started. As the temporary storage section 52, a large-capacity memory is presumed because recording data for several minutes or more must be held with high-speed access.

However, a microcomputer can read- or write-access the management area of the file through a microcomputer bus to the D-PRO section 51.

To record a plurality of streams that are simultaneously broadcast, the number of streams to be recorded, and PATs or PMTs (the number of PATs or PMTs equals the number of streams) are recorded in "number of streams" in the SOBI at the start of recording. At this time, CELLS equal in number to the streams to be recorded are prepared. The start and end times of each cell are stored in C_PBI (ST_PR_N) shown in FIG. 5 by the program number and APAT of the stream to be played back. Not the program number but the PID of the PMT may be directly stored. Alternatively, the actual contents of the PMT may be recorded. Accordingly, a stream selected from the VOB containing a plurality of streams can be played back. The PID of the video stream or audio stream of the stream to be played back may be recorded.

Figure 16:
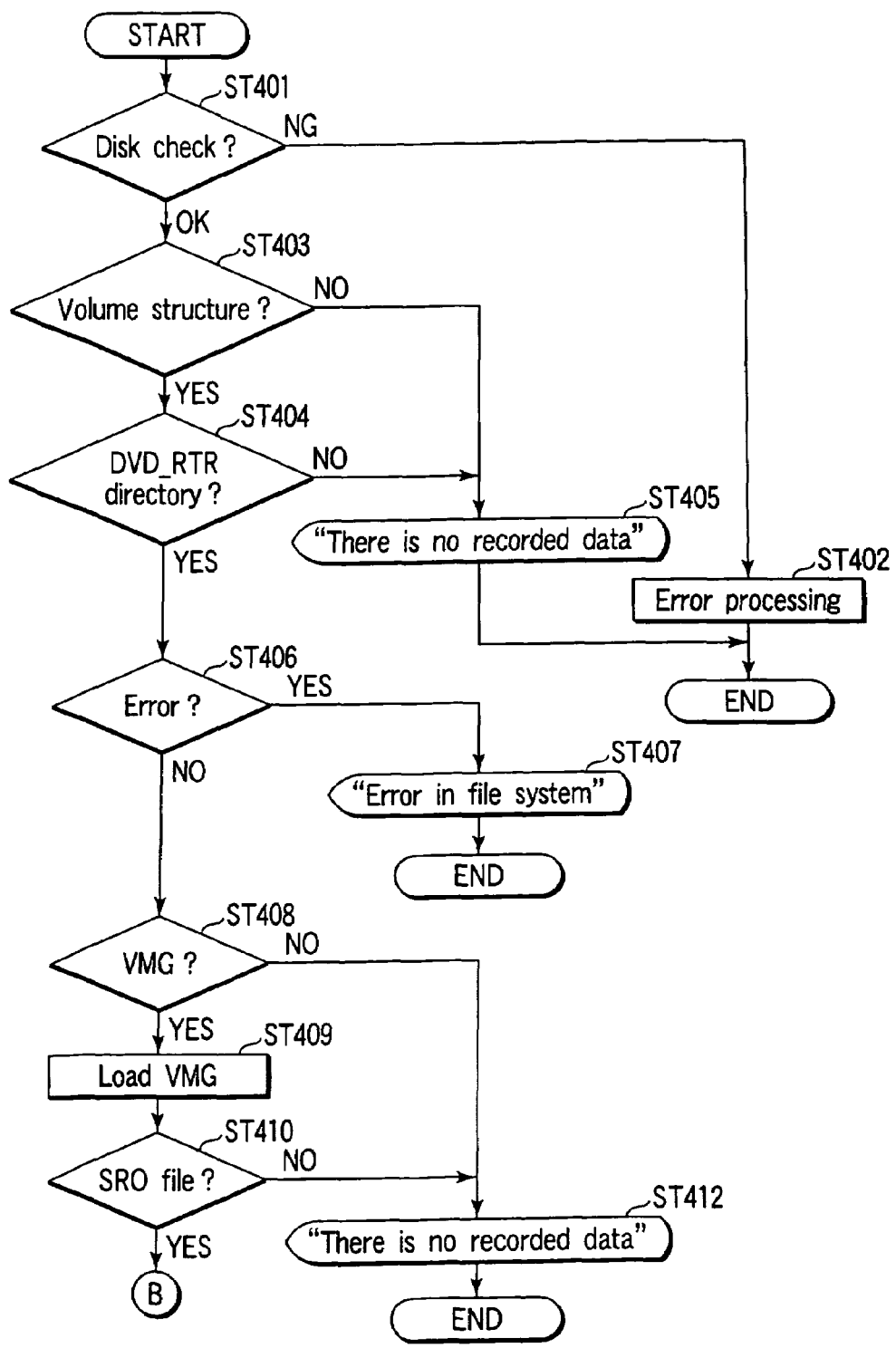
FIG. 16 is a flow chart showing whole data playback processing 1.
Figure 17:
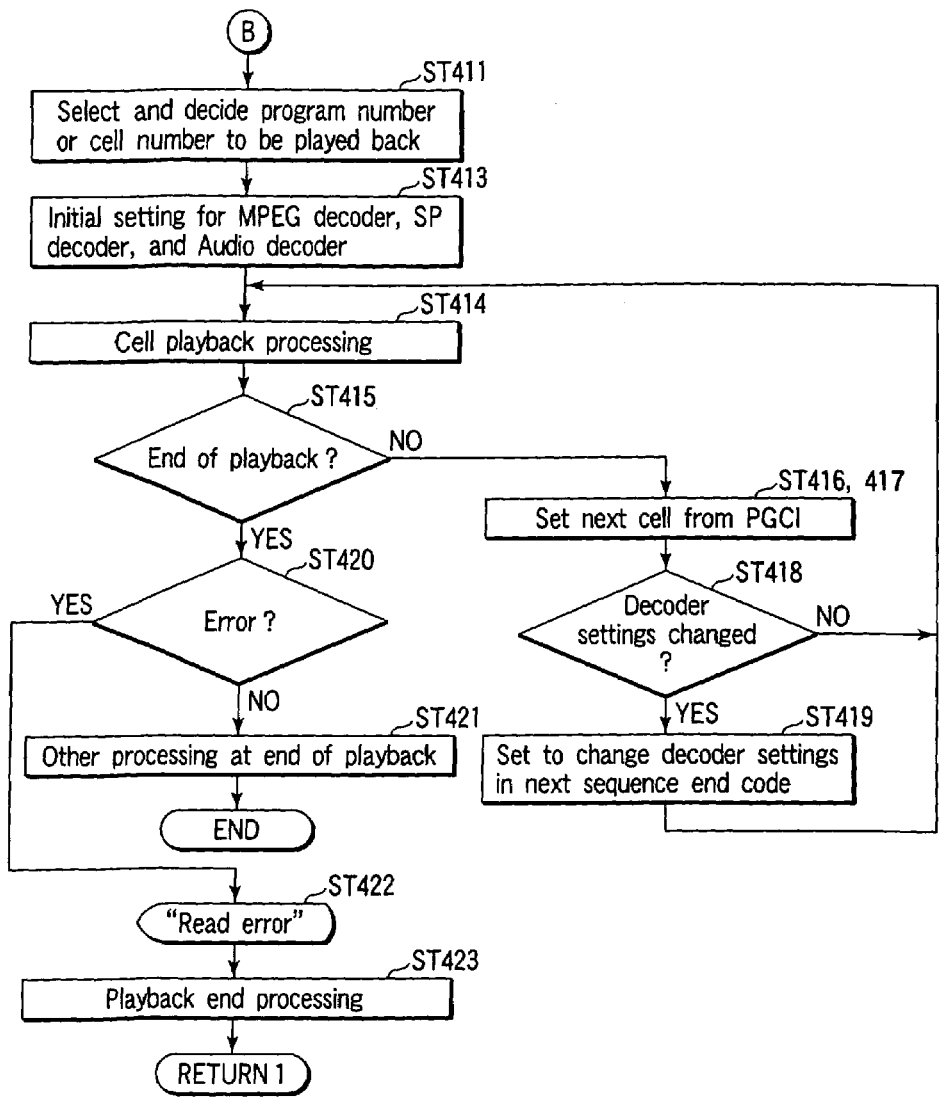
FIG. 17 is a flow chart showing whole data playback processing 2.

Data processing in the playback mode will be described with reference to FIGS. 16 and 17.

(1) Disk check is performed (ST401) to check whether the disk is a rewritable disk (DVD-R, DVD-RW, or DVD-RAM). If NO in step ST401, a message representing it is returned, and the processing is ended (ST402).

(2) The file system of the disk is read. It is checked whether a volume structure is present (ST403). If NO in step ST403, "there is no recorded data" is displayed, and the processing is ended (ST405).

(3) It is checked whether a DVD_RTR directory is present (ST404). If NO in step ST404, "there is no recorded data" is displayed, and the processing is ended (ST405).

(4) It is checked whether an SRO file is present (ST410). If NO in step ST410, "there is no recorded data" is displayed, and the processing is ended (ST412).

(5) The VMG file is loaded (ST409). A program or cell to be played back is decided (the user is caused to select the program or cell) (ST411). A file pointer (logic address) from which playback is to be started is decided. When playback according to the recording order is selected, playback is executed in accordance with ORG_PGCI. When a program is to be played back, playback is executed in accordance with UD_PGC of a number corresponding to the program to be played back.

(6) Processing at the start of playback is executed.

(7) Initial setting for each decoder is done (ST413).

(8) Cell playback processing (to be described later) is executed (ST414). It is checked whether playback is ended (ST415). If YES in step ST415, error check is performed. If YES in step ST420, a message representing it is displayed (ST422). If NO in step ST420, playback end processing is executed (ST423), and the operation is ended.

(9) The next cell is decided (ST417). It is checked whether the settings for the decoder have been changed (ST418). If YES in step ST418, the changed attribute is set in the decoder such that the settings for the decoder should be changed in the next sequence end code (at the end of VOB) (ST419).

(10) It is checked whether the settings (resolution and the like) for the video decoder section have been changed. If the settings have been changed, the changed attribute is set in the decoder such that the settings for the decoder should be changed after the last sequence end code of the cell (VOB).

Figure 18:
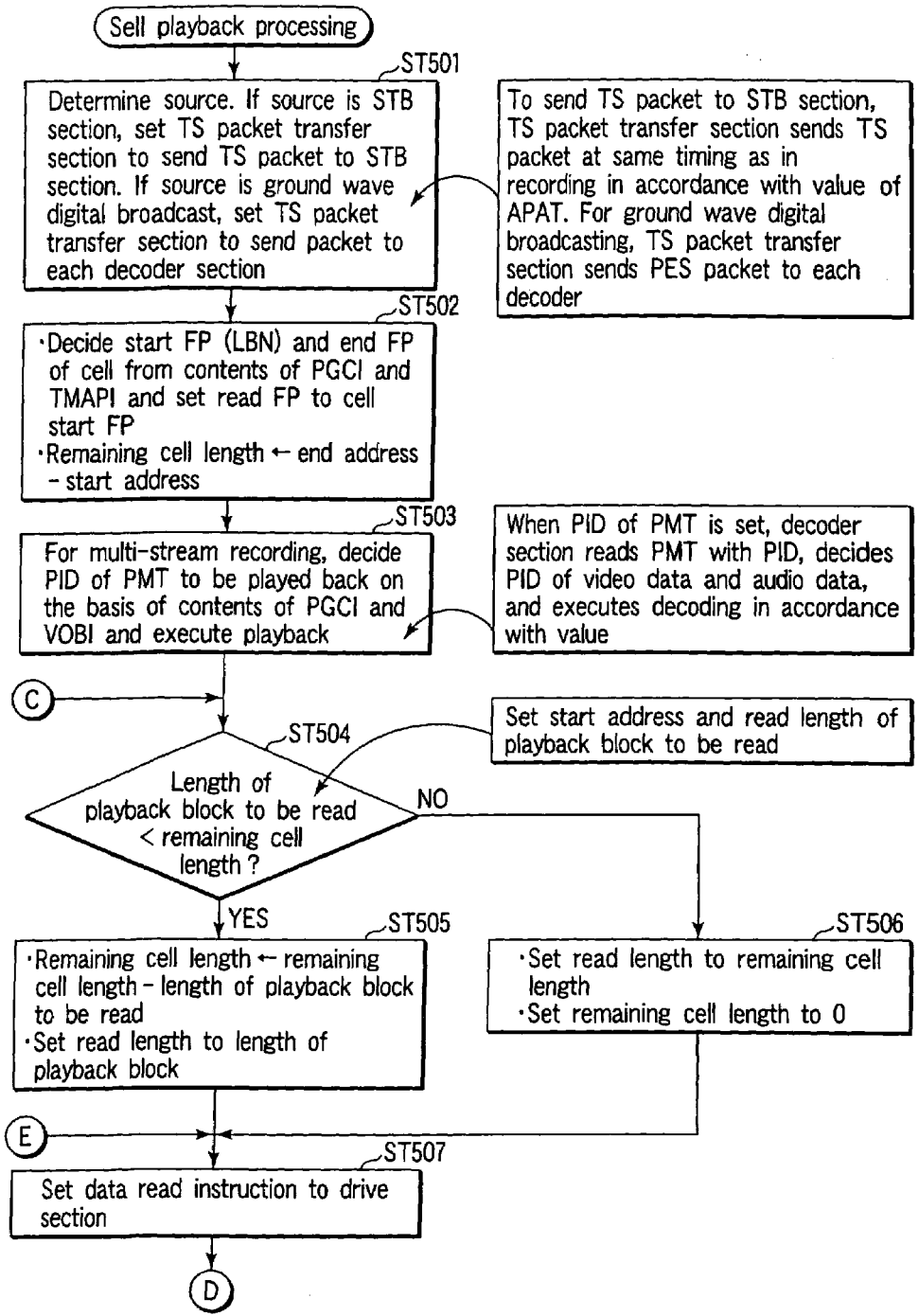
FIG. 18 is a flow chart showing cell playback processing 1.
Figure 19:
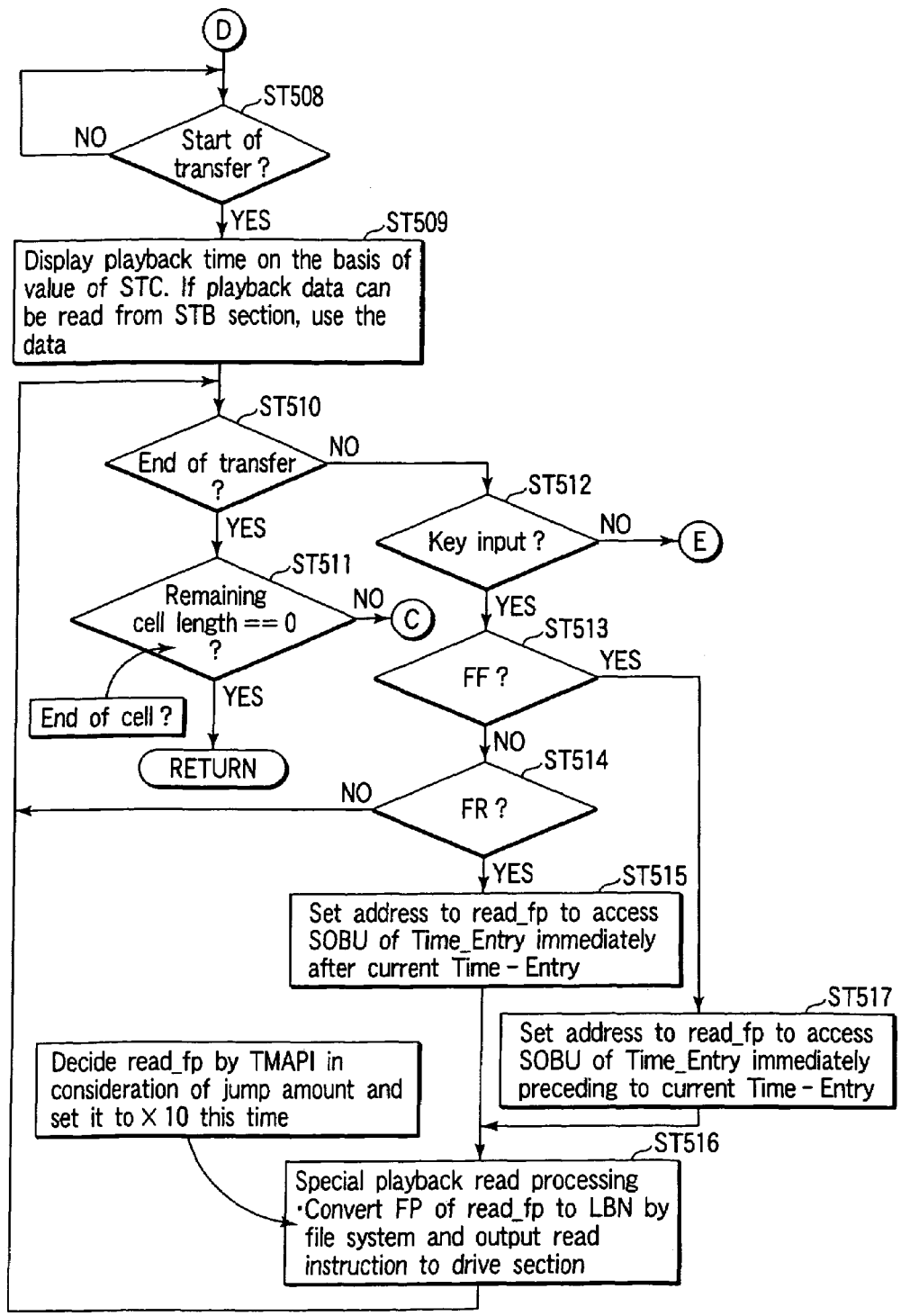
FIG. 19 is a flow chart showing cell playback processing 2.
Figure 20:
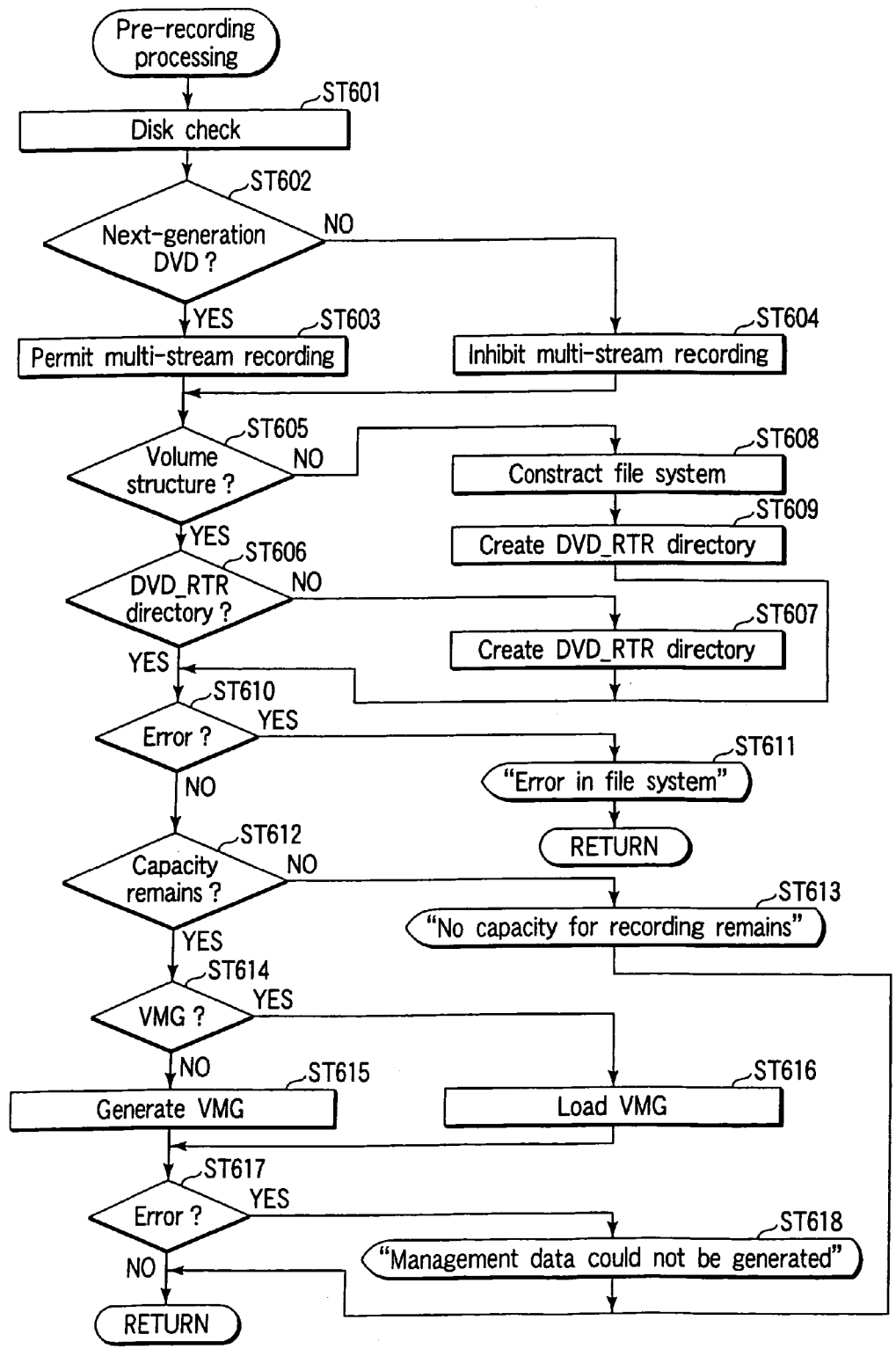
FIG. 20 is a flow chart showing pre-recording processing.

Cell playback processing will be described with reference to FIGS. 18 and 19.

(1) The start file pointer (logic block address) and end address file pointer (logic block address) of a cell are decided on the basis of PGCI and TMAPI. The start FP of the cell is substituted as the read FP. A value obtained by subtracting the start file pointer from the end file pointer is set to the remaining file length, (2) It is determined on the basis of the read SOBI whether the source of the stream to be played back is the STB section 56 or the ground wave digital tuner. If the source is the STB section 56, a TS packet sending instruction, the number of the program to be played back, and the start APAT are newly received from the STB section 56. The TS packet is sent to the STB section 56 in accordance with the instruction and APAT. In addition, the V mixing section is set to display a video signal from the STB section 56 (ST501).

For ground wave digital broadcasting, setting is done such that data is decoded in the decoder section without being sent to the STB section 56 (ST501). At this time, a PID is set in the TS packet to be played back to decide the object to be played back. The PID is read from the PMT in the SOBI and set. For SOBs of a plurality of streams, the PID is decided using the program number in C_PBI (ST503).

(3) Read processing during playback is executed. The read address and read size are decided from the start file pointer.

(4) The read unit size is compared with the remaining cell length (ST504). If the remaining cell length is larger, a value obtained by subtracting the read unit size from the remaining cell length is set to the remaining cell length (ST505). If the remaining cell length is smaller, the read length is set to the remaining cell length, and the remaining cell length is set to zero (ST506).

(5) The read length is set to the length of the read unit.

(6) The read address, read length, and read instruction are set to the drive section (ST507). In the decoder section 30, the separation section 31 receives the read pack data, places it into a packet. In accordance with the stream ID and substream ID, video packet data (MPEG video data) is transferred to the video decoding section, audio packet data is transferred to the audio decoding section, subvideo packet data is transferred to the SP decoding section, and the TS packet is transferred to the STB section 56 (ST508). When the source is a ground wave digital broadcast, the TS packet is converted into an element stream, then sent to each decoder through an internal bus, and subjected to decoding. The TS packet data sent to the STB section 56 is played back by the STB section 56. The video data is converted into a TV signal through the V mixing section and displayed on the TV. The audio signal is also sent to the D/A section and converted into audio data.

(7) During playback, the contents of the STC are displayed as the playback time (ST509). If the STB section 56 can display the playback time on the basis of the PTS in the video data, that playback time is used.

(8) It is checked whether transfer is ended (ST510). If transfer is not started, the flow returns to step ST507.

(9) A value obtained by adding the read FP to the read length set in (5) is substituted into the read FP.

(10) It is checked whether transfer is ended. If transfer is ended, the remaining cell length is checked. If the remaining cell length is not "00", the flow returns to (2). If the remaining cell length is "00", the processing is ended.

(11) If transfer is not ended, key input is checked (ST512). To execute special playback, the direction is set (ST513 and ST514). The read FP is calculated using TMAPI, load processing in the special playback mode is executed, and the processing is ended.

The target FP for special playback is obtained by skipping a predetermined time from TMAPI. The FP may be obtained by skipping not a predetermined time but a predetermined number of SOBUs. If the position has reached the end of the cell, the next cell information is read. TMAPI is selected from the SOB number used by the cell (one TMAPI is present in one SOB), and the read FP is obtained in a similar manner. If no cell remains, the processing is ended (the speed is ×10 in this embodiment).

The format according to the present invention based on the management data of RTR_DVD is as follows.

The program number (or a PMT or PID) of a program is recorded in C_PBI.

A PAT or PMT is recorded in SOBI. If no PAT or PMT is present in the stream, a PMT is generated from the default value of the broadcast station and recorded. If recording has started from a portion where no PAT or PMT is present, the closest PAT or PMT after the start of recording is stored.

If no PMT is present at the start of the SOBU at the start of the SOB, a flag representing it is recorded. As Time_Entry, SOBU information is stored every 10 pieces of information.

The average arrival time of each element of TMAP is stored in TMAPI.

Additionally, to cope with multi-stream simultaneous recording, a flag representing multi-stream recording and pieces of PMT information equal in number to the number of recorded streams are recorded in SOBI.

With the above arrangement, fine control operation corresponding to digital broadcasting can be realized. According to the present invention, support information can be recorded, and therefore, fine data management can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
a management area for recording management information; and
a data area for recording content data,
wherein the content data recorded in the data area contains a plurality of object data,
each object data contains a plurality of data units,
each data unit contains a plurality of packs,
each pack contains at least one packet,
the packet contains at least one transport stream packet,
the management information recorded in the management area contains program chain information which manages a playback order of data contained in the object data, and
the program chain information contains cell information.

* * * * *